(12) United States Patent
Noirfalise et al.

(10) Patent No.: US 11,641,344 B2
(45) Date of Patent: May 2, 2023

(54) SECURE REMOTE MAINTENANCE DEVICES AND METHOD, FOR REMOTE MAINTENANCE OF INDUSTRIAL EQUIPMENT

(71) Applicant: SAFRAN AIRCRAFT ENGINES, Paris (FR)

(72) Inventors: Pascal Noirfalise, Moissy-Cramayel (FR); Thibaut Barrouillet, Moissy-Cramayel (FR); Sylvain Eric Alain Belrepayre, Moissy-Cramayel (FR); Fabien Fouillet, Moissy-Cramayel (FR); Jean Vias, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1 day.

(21) Appl. No.: 16/979,945

(22) PCT Filed: Mar. 14, 2019

(86) PCT No.: PCT/FR2019/050567
§ 371 (c)(1),
(2) Date: Sep. 11, 2020

(87) PCT Pub. No.: WO2019/175512
PCT Pub. Date: Sep. 19, 2019

(65) Prior Publication Data
US 2021/0051133 A1 Feb. 18, 2021

(30) Foreign Application Priority Data
Mar. 14, 2018 (FR) ........................................ 1852185

(51) Int. Cl.
*G06F 15/16* (2006.01)
*H04L 9/40* (2022.01)

(52) U.S. Cl.
CPC ............ *H04L 63/029* (2013.01); *H04L 63/08* (2013.01)

(58) Field of Classification Search
CPC ... H04L 63/029; H04L 63/08; H04L 63/0884; H04L 63/105; H04L 63/108; H04L 63/102
(Continued)

(56) References Cited

U.S. PATENT DOCUMENTS 5,826,014 A * 10/1998 Coley ................. H04L 63/1458
726/12
2001/0044903 A1* 11/2001 Yamamoto .............. H04L 63/08
726/26
(Continued)

FOREIGN PATENT DOCUMENTS

| CN | 103926897 A | * | 7/2014 |
|---|---|---|---|
| CN | 103926897 B | | 9/2016 |
| DE | 102013221164 A1 | | 5/2015 |

OTHER PUBLICATIONS

French Search Report dated Nov. 5, 2018 in Application No. FR 1852185.
(Continued)

*Primary Examiner* — Kaylee J Huang
(74) *Attorney, Agent, or Firm* — Sughrue Mion, PLLC

(57) ABSTRACT

The invention relates to a housing (30) for managing access to an industrial network (10), to which industrial equipment (U1, U2, U3) is connected, the management housing (30) comprising: —a channel (30a) for access to an internet-type data network, said channel (30a) for access to the data network comprising a cut-off unit (33); —a channel (30b) for controlling the channel (30a) for access to the data network, said control channel (30a) comprising a controller (31) configured to control the cut-off unit (33) so as to allow communication between the industrial network and the data (Continued)

network, the cut-off unit comprising a cut-off relay that can be activated by means of a control signal emitted by the controller (31).

15 Claims, 2 Drawing Sheets

(58) Field of Classification Search
USPC .................. 709/229, 227, 217, 219, 203
See application file for complete search history.

(56) References Cited

U.S. PATENT DOCUMENTS

| | | | |
|---|---|---|---|
| 2010/0165878 A1* | 7/2010 | Soni ...................... | H04L 67/12 |
| | | | 370/254 |
| 2014/0044123 A1* | 2/2014 | Lawson .............. | H04L 65/1069 |
| | | | 370/352 |
| 2017/0264589 A1* | 9/2017 | Hunt .................... | G06F 21/552 |
| 2017/0366521 A1 | 12/2017 | Lei et al. | |
| 2018/0196615 A1* | 7/2018 | Gandelsman ....... | G06F 11/1464 |
| 2018/0262502 A1* | 9/2018 | Frank ................. | H04L 63/0823 |

OTHER PUBLICATIONS

International Search Report dated Jun. 12, 2019 from the European Patent Office in Application No. PCT/FR2019/050567.
Written Opinion dated Jun. 12, 2019 of the International Searching Authority in Application No. PCT/FR2019/050567.

* cited by examiner

SECURE REMOTE MAINTENANCE DEVICES AND METHOD, FOR REMOTE MAINTENANCE OF INDUSTRIAL EQUIPMENT

CROSS REFERENCE TO RELATED APPLICATIONS

This application is a National Stage of International Application No. PCT/FR2019/050567 filed Mar. 14, 2019, claiming priority French based on Patent Application No. 1852185 filed Mar. 14, 2018, the entire contents of each of which are herein incorporated by reference in their entireties.

GENERAL TECHNICAL FIELD AND PRIOR ART

The invention relates to the remote maintenance of industrial equipment, particularly that involved in the manufacture of aeronautical systems such as turbine engines.

In industry, and particularly in the aeronautical industry the industrial equipment involved is increasingly sophisticated and often requires maintenance operations which must usually be carried out by qualified interveners authorized to intervene on this equipment.

In order to manage the maintenance of this equipment, the latter is connected to a network, which is connected to a remote maintenance server to which an intervener can connect, provided that an entitled person authorizes his access.

However, the entitled person and the qualified intervener are not always present on the industrial site, so that outside his scheduled presence on the industrial site, opening communication and hence the remote breakdown service of the equipment is impossible.

One solution for allowing remote access at any time is to permanently connect the equipment to a remotely accessible network.

A solution of this type is not satisfactory, however, for reasons of security regarding the accessibility of the network.

PRESENTATION OF THE INVENTION

The invention allows the mitigation of the aforementioned disadvantages.

To this end, the invention relates, according to a first aspect, to a housing for managing access to an industrial network, to which industrial equipment is connected, the management housing comprising: a channel for access to an Internet-type data network, said channel for access to the data network comprising a cut-off unit, a channel for controlling the channel for access to the data network, said control channel comprising a controller configured to control the cut-off unit so as to allow communication between the industrial network and the data network.

The invention, according to the first aspect is advantageously completed by the following features, taken alone or in any technically possible combination:

the control channel comprises a first communication interface configured to place the housing into communication with a mobile network of the GSM type;

the cut-off unit comprises a cut-off relay which can be activated by means of a control signal originating in the controller;

the first communication interface is a GSM communication interface, the control signal being dependent on a received SMS;

the controller is configured to authenticate a user, the controller being configured to control the cut-off unit in order to establish a communication between the industrial network and the data network, provided that the user is authenticated.

The invention relates, according to a second aspect, to a remote maintenance server configured to be connected, on the one hand, to an industrial network to which a set of industrial equipment is connected and, on the other hand, to a housing according to the invention, the server comprising a control server configured to communicate with the housing, said server also comprising a firewall configured to manage access to the industrial network from said housing.

The invention, according to the second aspect, is advantageously completed by the feature according to which the firewall is configured to isolate a certain industrial equipment from the other equipment of the network so as to allow access to the isolated equipment only, without being able to gain access to the others.

The invention relates, according to a third aspect, to a method for remote maintenance of a set of industrial equipment connected together to an industrial network, the industrial network being connected with a housing for managing access to an industrial network according to the first aspect of the invention, the management housing being connected with a data network and a mobile network, the method comprising the following steps, an anomaly having been detected on a unit of the set, called the unit of interest:

receiving on the control channel of the housing a request for the purpose of establishing a remote maintenance communication between the industrial network and the data network, authenticating the request, and if the request is authenticated, establishing the remote maintenance communication between the industrial network and the data network.

The invention, according to the third aspect, is advantageously completed by the following characteristics, taken alone or in any technically feasible combination:

the mobile network is a GSM network, the request consisting of an SMS preferably comprising a confidential code allowing authentication of said request;

the housing being connected to a remote maintenance server, method in which the establishment of the remote maintenance communication comprises a step consisting of isolating the equipment of interest from the other equipment of the industrial network so that only the equipment of interest is connected to the industrial network;

the method comprises a step of connecting, by means of the management housing, a terminal of an intervener to the industrial network so that the latter can gain access to the equipment of interest via the data network in order to carry out maintenance operations on said equipment of interest; and once the maintenance operations are completed; the method comprises a step of disconnecting, by means of the management housing, the terminal of the operator from the industrial network, the industrial network no longer being accessible via the internet network;

the step of connecting the terminal of the intervener comprises authentication of said intervener in order to verify that he is authorized to connect to the industrial network;

the method comprises a step of restoring the industrial network so that all of the industrial equipment is accessible via the industrial network but inaccessible from the internet network. The advantages of the invention are manifold;

The invention allows a person entitled to control the remote maintenance solution to set in place secured remote maintenance connections so that a maintenance operator, who is therefore entitled, can connect and perform maintenance or breakdown service of industrial equipment at any time and from any location throughout the world.

The housing integrated into a system allowing remote maintenance to be accomplished can be controlled remotely via a mobile, particularly a cellular network (GSM network) while having high security.

It is therefore possible, for maintenance, to put in place a secured remote maintenance connection to allow additional support for an operator located outside the industrial site at any time.

In particular, the housing allows the opening of an electronic circuit allowing the connection between the remote maintenance server and a data network. The opening can be accomplished locally or via a mobile network, this then allows the maintenance operator to securely gain access to industrial equipment.

PRESENTATION OF THE FIGURES

Other features, objects and advantages of the invention will be revealed from the description that follows, and which is purely illustrative and not limiting, and which must be read with reference to the appended drawings in which.

In all the figures, similar elements have identical reference symbols.

DETAILED DESCRIPTION OF THE INVENTION

Figure 1:
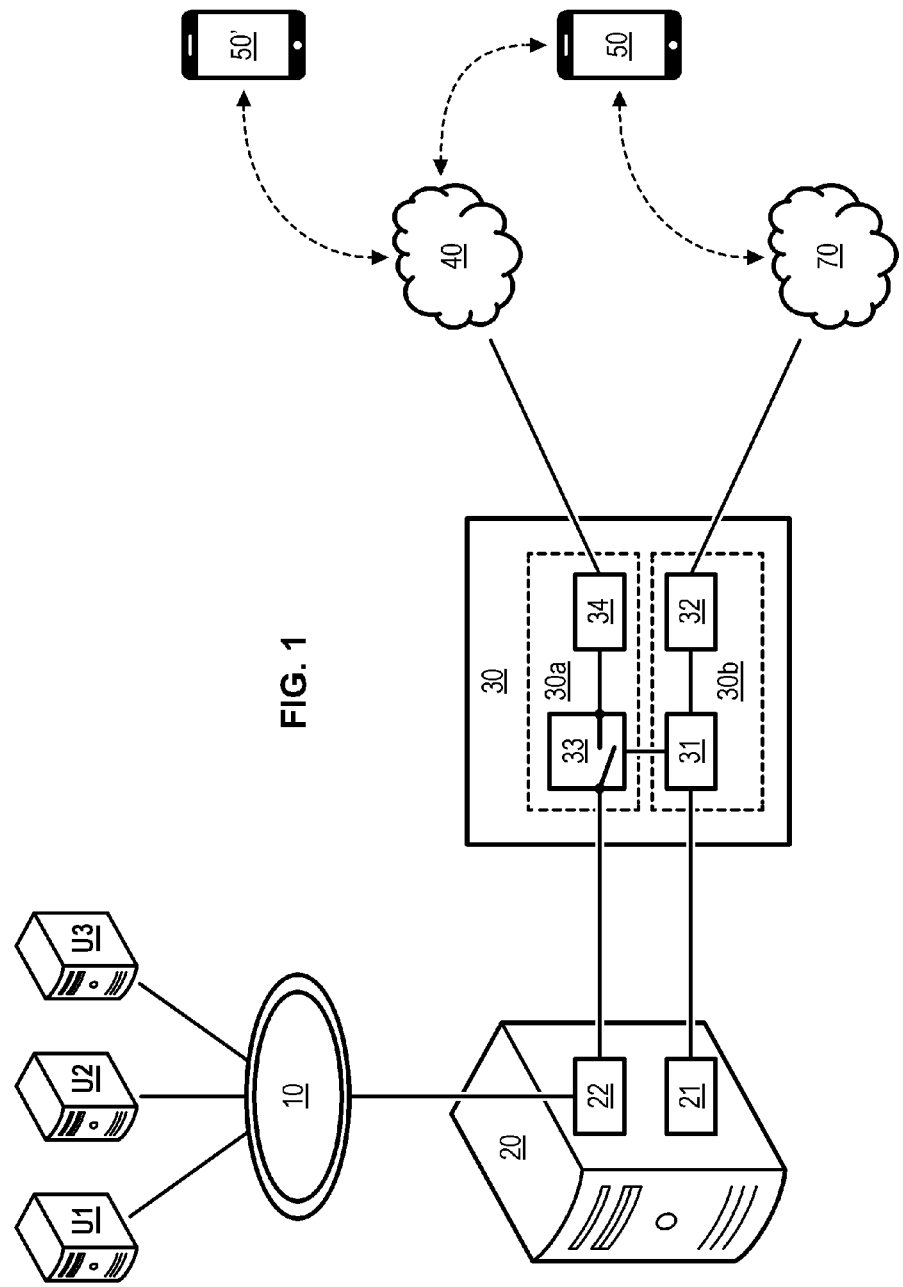
FIG. 1 shows a remote maintenance environment conforming to the invention.

With reference to FIG. 1, industrial equipment U1, U2, U3 is connected to an industrial network 10. An industrial network 10 of this type is well known to a person skilled in the art and will not be detailed further here.

A remote maintenance server 20 is connected to the industrial network 10. A server 20 of this type allows verifying the security of maintenance communications relative to the industrial equipment of the industrial network 10. In particular, the remote maintenance server 20 allows managing access to the industrial network and therefore access to the industrial equipment connected to it. It is by means of this remote maintenance server 20 that the maintenance operations as such are accomplished.

The server 20 comprises a control server 21 configured to communicate with the housing 30, and also comprises a firewall 22 allowing filtering the connections depending on the intervention to be carried out on certain industrial equipment. Thanks to the firewall 22, the remote maintenance server 20 allows isolating a certain industrial equipment from the other equipment of the network so that a user terminal can gain access only to the isolated equipment without being able to gain access to others.

In addition, a housing for managing access to the industrial network is connected to the remote maintenance server 20.

This housing 30 allows managing access by an intervener for the remote maintenance of the industrial network 10 via the remote maintenance server 20 by means of a communication terminal 50'.

In particular, as will be described below, the housing 30 allows the opening and the closing of remote maintenance communication in order to be able to perform remote breakdown service on industrial equipment of the industrial network 10 by means of an Internet-type data network 40.

Advantageously, it is by means of a mobile network 70, of the GSM type, that an entitled person, via his terminal 50, can trigger a remote maintenance communication for an authorized maintenance intervener or for himself.

In this manner, an authorized maintenance operator of the entitled person can connect to the industrial network 10 via the data network 40, by means of a terminal 50, 50', for the purpose of performing breakdown service on certain industrial equipment U1, U2, U3 of the network 10.

In the example of FIG. 1, one terminal 50 is considered to be for the entitled person and another terminal 50' for the maintenance operator, so that they are two different persons, but the invention also applies to the case where the entitled person opens the remote maintenance communication for himself.

As will have been understood, the housing allows two distinct connections: one connection to a data network 40 and another connection to a mobile network 70.

In addition, one terminal 50, 50' is for example a smartphone, a tablet or even a mobile computer. It will be understood, however, that for the establishment of the remote maintenance communication via the mobile network 70, the terminal is able to connect to such a network. Just as for the terminal for performing the remote maintenance via the data network 40, the terminal is able to connect to a data network of this type.

Still with reference to FIG. 1, the management housing 30 comprises a channel 30a for access to an Internet-type data network and a channel 30b for controlling said channel 30a for access to the data network.

Advantageously, the control channel 30a comprises a first communication interface 32 allowing access to a GSM type wireless network 70.

The channel 30a for access to the data network comprises a second communication interface 34 allowing access to an Internet-type data network 40.

Thus, as will have been understood, the management housing 30 is preferably both connected to a wired mobile network 70 (of the GSM type for example) and to an Internet-type data network 40.

What is meant specifically by connected to the mobile network 70 and to the data network 40 is that it is possible to establish communication between the management housing 30 and one or the other of the data network 40 or the mobile network 70.

The housing 30 has two distinct functionalities.

The first functionality is that of controlling via the control channel 30b the opening or the closing of the remote maintenance communication between the industrial network 10 and the data network 40. The opening or the closing of the remote maintenance communication as such being carried out by means of the channel 30a for access to the data network 40.

The second functionality is to secure access to the industrial network 10. For this reason, the channel 30a for access to the data network 40 comprises a cut-off unit 33 configured to physically isolate the industrial network 10 from the data network so that no communication can be established from the data network 40. To control the cut-off unit 33, the control channel 30b comprises a controller 31 configured to control the cut-off unit 33 so as to allow access to the industrial network 10 from the data network 40 and thus establish a remote maintenance communication.

Complementarily, the firewall 22 of the remote maintenance server 20 also has the functionality of communicating with the controller 31 of the cut-off housing 30 in order to authorize or not the opening of the remote maintenance communication.

In order to generate the opening or the closing of the remote maintenance communication, the controller 31 is connected with the remote maintenance server 20 and with the first communication interface 32.

The connections between the first communication interface 32 and the controller 31, on the one hand, and between the controller 31 and the remote maintenance server 20 are known connections of the RS232 type.

The opening and the closing of the remote maintenance communication are managed by the control channel 30b. In particular, a request for the purpose of establishing remote maintenance communication originating in the mobile network 70 must be authenticated. This request emanates from an entitled person.

An authentication of this type is implemented by the controller 31 which processes the information received from the first communication interface 32 and transmits them to a server 21 for controlling the remote maintenance server 20.

The control server 21 comprises a memory (not shown) in which a list of authorized interveners is stored. The controller 31 is therefore configured to implement a comparison between the data of the control service 21 and the data relating to the identity of the person having emitted the request for establishing the remote maintenance communication.

The first communication interface 32 is a GSM communication interface comprising a SIM card in order to be able to connect the management housing 30 to a mobile network of a GSM operator. In this case, the entitled person can send his request for the purpose of opening the remote maintenance communication via the sending of an SMS.

Advantageously, the transmitted SMS responds to a very particular syntax allowing identifying the entitled person and also comprising the control command which will be transmitted by the controller 31 to the control service 21.

Moreover, for obvious security reasons, the SMS comprises a confidential code typically consisting of 8 numerals which allows authenticating the entitled person.

Thus, the SMS is advantageously composed of three fields:
  a first field constituted by the confidential code
  a second field constituted by a command for opening or closing the remote maintenance communication
  a third field constituted by the control command of a particular industrial equipment item.

The control command is a command of a particular industrial equipment item U1, U2, U3 to allow its maintenance via the remote maintenance communication. It consists, in other words, of a command applied to a certain equipment for the purpose of allowing its remote maintenance.

The controller 31 is therefore configured to process the request received (the SMS) in order to compare the identity which it contains to the list of entitled persons stored in the memory of the control server 21 (in the case of the SMS, verification of the identity will be implemented thanks to the telephone number from which the SMS originated and thanks to the confidential code contained in the SMS).

Once the comparison is validated, the controller 31 generates a control signal which allows controlling the cut-off unit 33 in order for the latter to place the industrial network 10 into communication with the data network 40 by means of the second communication interface 34.

Advantageously, the cut-off unit 33 comprises an electronic relay allowing physical cut-off between two RJ45 communication ports of which one is connected to the remote maintenance server 20 by means of a security gateway 22 and the other to the internet data network 40. Thus, thanks to a control signal originating in the controller 31 adapted to the relay, the connection or the disconnection of the two communication ports is controlled. The relays being controlled by a 12 Vcc signal, the control (5 Vcc) signal originating in the controller is adjusted via an electronic voltage amplifier.

Alternatively, the cut-off unit 33 can be locally controlled in order to allow the opening or the closing of the circuit without passing through the SMS mode. In this case, authentication is carried out directly, locally and not remotely, by sending a request to the controller 31 via the control service 21 of the server.

Figure 2:
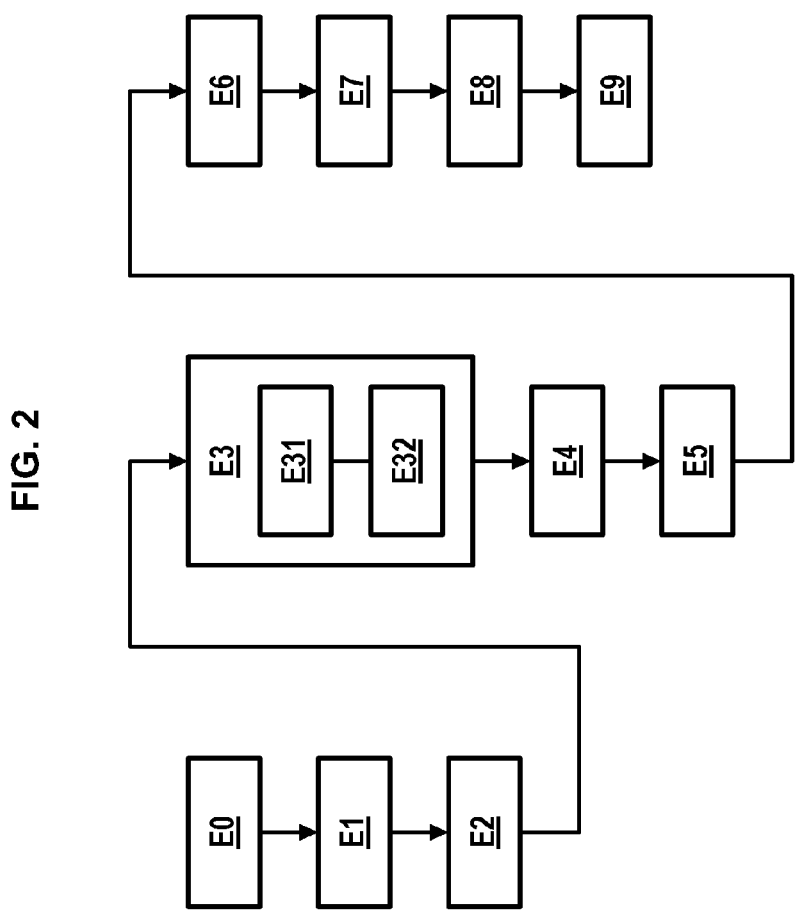
FIG. 2 illustrates steps of a remote maintenance method according to the invention.

A remote maintenance method implemented in the environment of FIG. 1 described above is described with reference to FIG. 2.

In a preliminary step (step E0), an anomaly on a certain industrial equipment of the industrial network 10 is detected and communicated to the maintenance service of the industrial site.

If the maintenance service has an interest in a remote maintenance communication for having additional remote support, it carries out the opening or asks an entitled person to proceed with the establishment of a secured remote maintenance communication in order to makes the equipment of the industrial network for which an anomaly is detected remotely accessible.

Hereafter, the industrial equipment for which an anomaly is detected is called the "equipment of interest."

The management housing 30 is in communication with the mobile network 709 and is awaiting reception of a request for the purpose of establishing a remote maintenance communication between the industrial network 10 and the data network 40. The request can consist of the SMS previously described, originating from the entitled person.

At this stage, the management housing 30 is solely accessible via the mobile network 70, or locally if the request is local.

A request for the purpose of establishing a remote maintenance communication between the industrial network 10 and the data network 40 is received (step E1) by the control channel 30b. The request comprises in particular the identity of the person entitled to request the establishment of the remote maintenance communication. The identity consists of the telephone number from which the SMS constituting the request originated.

This request is then authenticated (step E2). More precisely, the authentication consists in that the controller 31 of the housing 30 compares the identity of the entitled person to a list of persons stored in the control server 21 of the remote maintenance server 20. In the case of sending the SMS at this step, the system also verifies the confidential code contained in the SMS.

Once this request is authenticated, the remote maintenance communication is established (step E3).

For this reason, the housing 30, via the controller 31, controls (step 32) the cut-off unit 33 to place the industrial network 10 into communication with the data network 40 by means of said cut-off unit 33.

Advantageously, the industrial network 10 is in communication with the data network 40 by means of the second communication interface 34.

In a complementary manner, the establishment of the remote maintenance communication comprises, prior to the control of the cut-off unit a step (step 31) consisting of isolating the industrial equipment on which an intervention is required on the industrial network 10 from the other industrial equipment. In other words, only the industrial equipment of interest is accessible on the industrial network 10.

Once the remote maintenance communication is established, a maintenance operate can connect (step E4) to the industrial network 10 via the data network 40 by means of his terminal (smartphone, tablet, computer, etc.).

To allow the connection of the maintenance operator, the entitled person having asked for the opening of the remote maintenance communication transmits to the maintenance operator a connection link of the "URL" type, then identification information. Thanks to this link, the maintenance operator has access to an interface allowing ensuring the maintenance of certain industrial equipment.

The connection of the maintenance operator is accomplished via an Internet-type connection on the remote maintenance server 20 and comprises an authentication. This authentication consists of verifying that the intervener who is connecting on the server is the expected one, then authorizing crossing the firewall 22 located on the remote maintenance server 20. A secured connection is then established.

Once this secured connection is established, the management housing 30 allows placing the industrial network 10 into communication with the terminal of the intervener so that the latter can gain access to the equipment of interest. This placing into communication allows the terminal of the intervener to gain access to the equipment of interest through the network 40 in order to carry out maintenance operations. During this step, the management housing has "physically" connected the industrial network 10 to the internet network 40.

Then the intervener carries out (step E5) one or more maintenance operation(s) on the equipment of interest.

When the maintenance operation(s) are completed, the intervener disconnects (step E6) from the industrial network 10. This step E6 is initiated by the intervener via his terminal.

The remote maintenance server 20 then controls the controller 31 of the management housing (step E7) so that it controls the cut-off unit 33 in order to again isolate the industrial network 10 from the data network.

The industrial network 10 no longer being accessible, a restoration of the latter is implemented (step E8): all of the industrial equipment is then connected to the industrial network.

The last step (step E9) is implemented by the remote maintenance server 20, and consists of tracing the actions carried out by the maintenance operator on the equipment of interest.

Preferably, the control service 21 records the actions carried out on the industrial network 10, for example in the form of a video, in order to guarantee the integrity of the production data.

The invention claimed is:

1. A housing comprising:
a channel comprising a first communication interface for access to an Internet-type data network, said channel for access to the Internet-type data network comprising a cut-off unit, wherein the cut-off unit is configured to physically isolate an industrial network to which industrial equipment is connected from the Internet-type data network so that no communication can be established between the industrial network and the Internet-type data network, wherein the cut-off unit comprises a cut-off relay allowing physical cut-off between the industrial network and the Internet-type data network; and
a control channel for controlling the channel for access to the Internet-type data network, the control channel comprising a second communication interface allowing access to a second network different to the Internet-type data network and a controller configured to control the cut-off unit so as to allow communication between the industrial network and the Internet-type data network, wherein the cut-off relay can be activated by means of a control signal originating in the controller connected to the second network.

2. The housing according to claim 1, wherein the first communication interface is configured to place the housing into communication with a mobile cellular network of a Global System for Mobile communications (GSM) type.

3. The housing according to claim 2, wherein the first communication interface is a GSM communication interface, the control signal being dependent on a received Short Message System (SMS).

4. The housing according to claim 1, wherein the controller is configured to authenticate a user, the controller being configured to control the cut-off unit in order to establish a communication between the industrial network and the Internet-type data network, provided that the user is authenticated.

5. A remote maintenance server configured to be connected to the housing according to claim 1, the remote maintenance server being configured to be connected to the industrial network to which the industrial equipment is connected and comprising a control server configured to communicate with the housing, said remote maintenance server also comprising a firewall configured to manage access to the industrial network from said housing.

6. The remote maintenance server according to claim 5, wherein the firewall is configured to isolate a certain industrial equipment from an other industrial equipment of the industrial network so as to allow access to the isolated industrial equipment only, without being able to gain access to the other industrial equipment of the industrial network.

7. The remote maintenance server according to claim 6, wherein the firewall is configured to isolate the certain industrial equipment of the industrial network depending on a maintenance operation to be carried out on said certain industrial equipment.

8. The remote maintenance server according to claim 5, wherein the firewall is configured to communicate with the controller of the control channel in order to authorize or deny an opening of a remote maintenance communication between the industrial network and the Internet-type data network.

9. A method for remote maintenance of a set of industrial equipment connected together to an industrial network, the industrial network being connected with a housing including:
a channel comprising a first communication interface for access to an Internet-type data network, said channel for access to the Internet-type data network comprising a cut-off unit, wherein the cut-off unit is configured to physically isolate the industrial network from the Internet-type data network so that no communication can be established between the industrial network and the Internet-type data network, wherein the cut-off unit comprises a cut-off relay allowing physical cut-off between the industrial network and the Internet-type data network; and a control channel for controlling the channel for access to the Internet-type data network, the control channel comprising a second communication interface allowing access to a second network different to the Internet-type data network and a controller configured to control the cut-off unit so as to allow communication between the industrial network and the Internet-type data network, wherein the cut-off relay can be activated by means of a control signal originating in the controller connected to the second network, the housing being connected with the Internet-type data network and a mobile network, the method comprising the following steps, an anomaly having been detected on an industrial equipment of interest of the set:

receiving on the control channel of the housing, via the mobile network, a request for a purpose of establishing a remote maintenance communication between the industrial network and the Internet-type data network, authenticating the request, and when the request is authenticated, establishing the remote maintenance communication between the industrial network and the Internet-type data network.

10. The method according to claim 9, wherein the mobile network is a mobile cellular network of a Global System for Mobile communications (GSM) type, the request consisting of a Short Message System (SMS) comprising a confidential code allowing authentication of said request.

11. The method according to claim 9, wherein the housing is connected to a remote maintenance server, and the establishing of the remote maintenance communication comprises isolating the industrial equipment of interest from remaining industrial equipment of the industrial network so that only the industrial equipment of interest is connected to the industrial network.

12. The method according to claim 9, further comprising a step of connecting, by means of the housing, a terminal of an intervener to the industrial network so that the terminal can gain access to the industrial equipment of interest via the Internet-type data network in order to carry out maintenance operations on said industrial equipment of interest; and once the maintenance operations are completed, the method comprises a step of disconnecting, by the means of the housing, the terminal of the intervener from the industrial network, the industrial network no longer being accessible via the Internet-type data network.

13. The method according to claim 12, wherein the step of connecting the terminal of the intervener comprises authentication of said intervener in order to verify that the intervener is authorized to connect to the industrial network.

14. The method according to claim 9, comprising a step of restoring the industrial network so that all of the industrial equipment is accessible via the industrial network but inaccessible from the Internet-type data network.

15. A system for managing access to an industrial network comprising a housing for managing access to the industrial network to which a set of industrial equipment is connected, the housing comprising:

a channel comprising a first communication interface for access to an Internet-type data network, said channel for access to the Internet-type data network comprising a cut-off unit, wherein the cut-off unit is configured to physically isolate the industrial network from the Internet-type data network so that no communication can be established between the industrial network and the Internet-type data network, wherein the cut-off unit comprises a cut-off relay allowing physical cut-off between the industrial network and the Internet-type data network; and a control channel for controlling the channel for access to the Internet-type data network, the control channel comprising a second communication interface allowing access to a second network different to the Internet-type data network and a controller configured to control the cut-off unit so as to allow communication between the industrial network and the Internet-type data network, wherein the cut-off relay can be activated by a control signal originating in the controller connected to the second network, wherein the system for managing access to the industrial network further comprises a remote maintenance server configured to be connected to the industrial network to which the set of industrial equipment is connected, and to the housing, the remote maintenance server comprising a control server configured to communicate with the housing, said remote maintenance server also comprising a firewall configured to manage access to the industrial network from said housing.

* * * * *